United States Patent [19]
Hsu

[11] Patent Number: 5,231,909
[45] Date of Patent: Aug. 3, 1993

[54] SAW BLADE AND METHOD OF MAKING THE SAME

[76] Inventor: An-Sun Hsu, No. 99, Yu-Ai St., Tainan, Taiwan

[21] Appl. No.: 807,113

[22] Filed: Dec. 13, 1991

[51] Int. Cl.$^5$ .............................................. B27B 33/02
[52] U.S. Cl. ....................................... 83/835; 83/848; 83/852
[58] Field of Search ................. 83/835, 846, 848, 851, 83/852

[56] References Cited

U.S. PATENT DOCUMENTS

| | | | |
|---|---|---|---|
| 4,492,141 | 1/1985 | Takeuchi | 83/852 |
| 4,867,026 | 9/1989 | Henning et al. | 83/835 |

*Primary Examiner*—Eugenia Jones
*Attorney, Agent, or Firm*—Harness, Dickey & Pierce

[57] ABSTRACT

A saw blade includes the: (1) provision of a trapezial tooth between every two triangular teeth, the trapezial tooth having two opposite sides which extend towards one another at a top end, a distal bottom end opposite the top end and two opposite trapezial faces; (2) provision of cutting edges by forming two inclined faces which converge from one of the trapezial faces towards the other one of the trapezial faces; (3) provision of a cut at a rear one of the inclined faces which cut forms an inverted "L" shape that extends vertically to a predetermined height from the distal bottom end; and (4) the grinding of the distal bottom end to form a triangular tip face which extends inclinedly from a front section to a rear section of the trapezoid tooth.

2 Claims, 8 Drawing Sheets

SAW BLADE AND METHOD OF MAKING THE SAME

BACKGROUND OF THE INVENTION

1. Field of Invention

This invention relates to a saw blade, more particularly to a method for making a saw blade which can saw an article more efficiently than the prior art saw blade.

2. Description of the Related Art

Referring to FIG. 1, a conventional saw (A) is shown to comprise a plurality of teeth (A1, A2, ..., A4), each having a triangular shape when viewed from a side perspective. Each tooth has an apex and two opposite first and second triangular flat faces. Two inclined edges (a1) converge from said first triangular flat face towards said second triangular flat face as shown in FIG. 2 in such a manner that portions of the two inclined edges meet on said second triangular flat face. The teeth (A1,A3) adjacent to the tooth (A2) are also formed in the same manner on the first triangular flat face (not depicted in FIG. 1). In order to avoid by tiny dust particles falling from an article being sawed, the tip end of each tooth is bent, one opposite the other, so that the whole saw blade will appear as illustrated in FIGS. 3 and 4.

It has been found that the saw blade (A) thus made though able to saw a piece of wood, easily goes blunt. In addition, one has to exert a considerable amount of energy in order to saw an article (B). The path (B1) which is cut in the article (B) is not even, either.

FIGS. 5 to 8 show a saw blade of an improved type. The saw blade C has a gradually increasing thickness from a top longitudinal end to a bottom longitudinal end. A plurality of teeth (C1) are formed along the bottom longitudinal end as shown in FIG. 5. The teeth (C1) have two opposite sides which cooperatively form an apex and two opposite first and second triangular flat faces. Two inclined edges (C12, C11) of the tooth (C1) converge from the first triangular flat face towards the second triangular flat face so that portions (C14) of the two inclined edges meet on the second triangular flat face as shown in FIG. 6. The apex of the tooth (C1) is ground off in such a manner that the apex has an inclined triangular tip end (C13) as shown in FIG. 7. An adjacent tooth of the tooth (C1) is treated as in the above-mentioned manner but on the first triangular flat face so that the whole saw blade will appear as shown in FIG. 8.

Such a saw blade can provide an even path in the article being sawed and only a small amount of energy is required to operate the saw blade.

It has been found through several experiments that since a piece of wood is made up of several growth rings, the saw blade can easily saw the wood when the growth rings are located transversely from the direction of the movement of the saw blade. However, when the growth rings in the wood are located in the same direction as the movement of the saw blade, broken small particles of the growth rings can become tangled in the teeth of the saw blade thereby hindering the movement of the saw blade in the sawing path.

SUMMARY OF THE INVENTION

The primary feature of the present invention is the provision of a saw blade and a method for making the same in which the saw blade produced accordingly does not have the disadvantages explained above.

According to the present invention, the method for making the saw blade includes the following steps: (1) providing a tooth having an initial trapezial shape as viewed from the side between triangular teeth which triangular teeth are treated by the prior art method, said trapezial tooth having two opposite sides which extends towards one another at a top end and a distal bottom end opposite the top end and having two opposite trapezoid shaped side faces; (2) providing cutting edges by forming two inclined faces which converge from one of the trapezoid shaped faces to the other one of the trapezoid faces; (3) providing a cut at a rear portion on one of the inclined faces which cut extends vertically from the distal bottom end to a predetermined height; and (4) grinding the distal bottom end to form a triangular tip face which extends inclinedly from a front portion to a rear portion of the initial trapezial shaped tooth.

BRIEF DESCRIPTION OF THE DRAWINGS

Other features and advantages of the present invention will become more apparent in the following detailed description, including drawings, all of which show a non-limiting form of the present invention, and of which.

DETAILED DESCRIPTION OF THE PREFERRED EMBODIMENT

Figure 9:
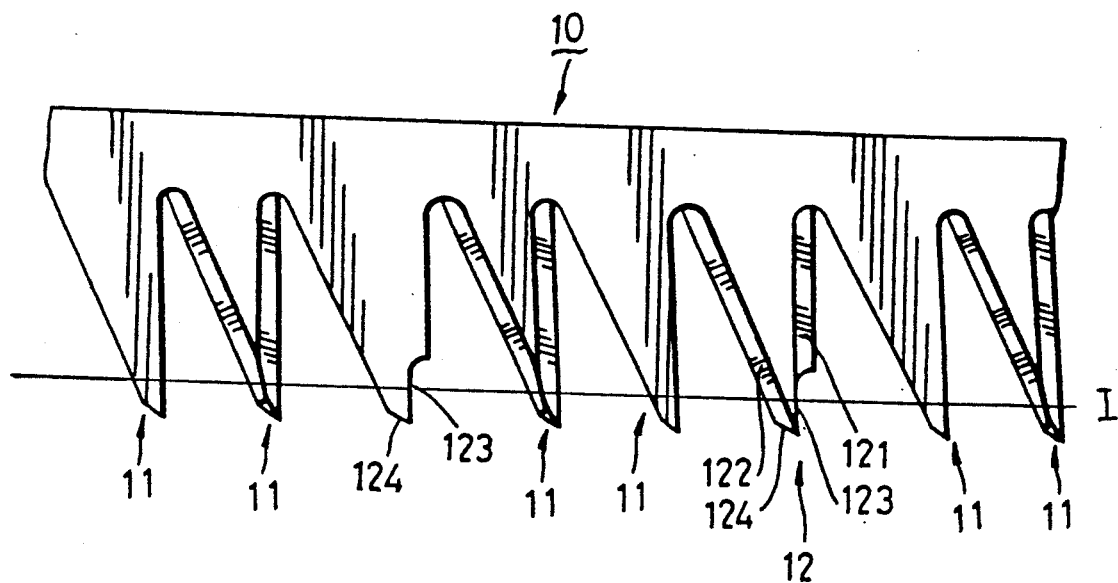
FIG. 9 shows a schematic, perspective view of a saw blade consisting of two types of teeth produced according to the method of the present invention.
Figures 10, 11:
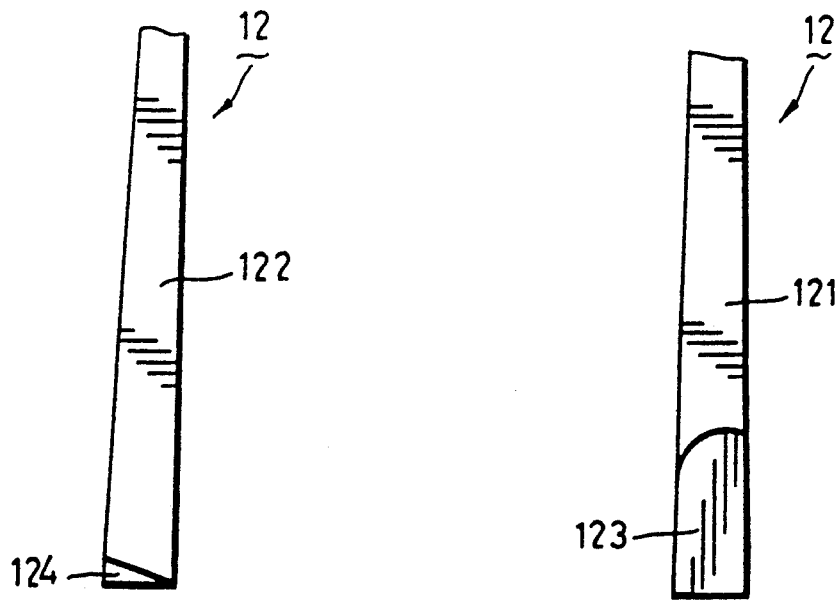
FIG. 10 shows an enlarged side view of a tooth of the saw blade of FIG. 9.
FIG. 11 shows an enlarged view of the tooth of the saw blade of FIG. 9.
Figure 12:
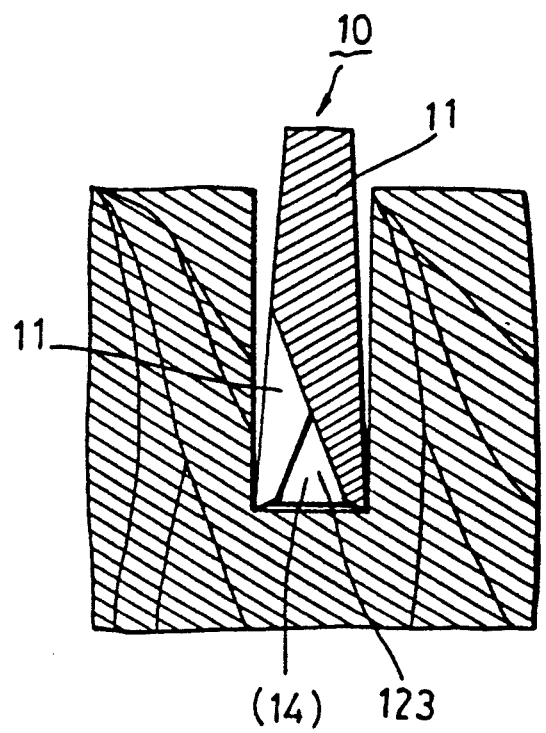
FIG. 12 shows the saw blade of the present invention in use.

Referring to FIG. 9, a saw blade (10) produced according to the method of the present invention includes a first type triangular shaped tooth (11) and a second type tooth (12) having an initial trapezial shape as viewed from the side. Each of the second type of teeth is alternatively provided between every two of the first type of teeth.

Figure 13A:
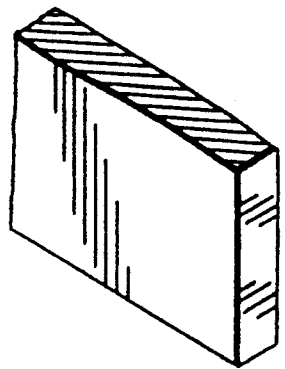
FIGS. 13, (a) to (d) demonstrate the steps of making the first type of teeth shown in FIG. 9.
Figure 13B:
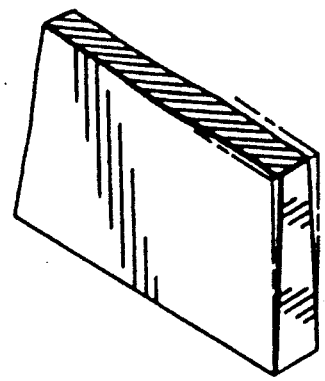
Figure 13C:
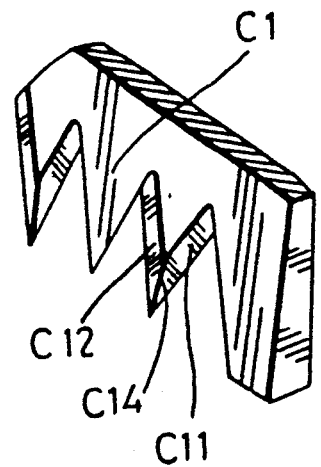
Figure 13D:
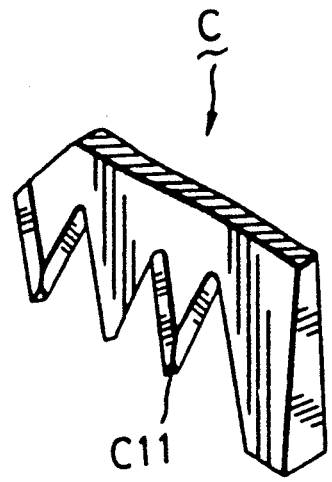
Figure 14A:
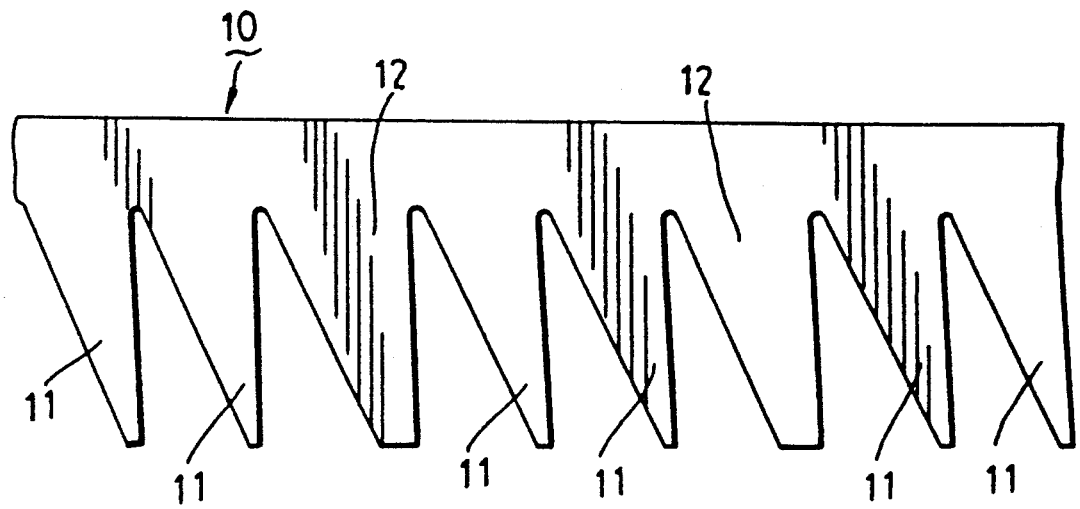
FIGS. 14 (a) to (d) demonstrate the steps of making the second type of teeth shown in FIG. 9.
Figure 14B:
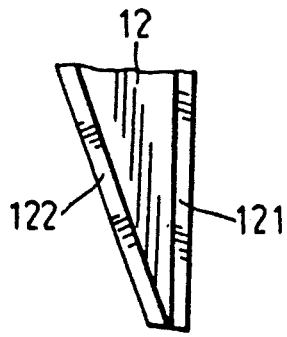
Figure 14C:
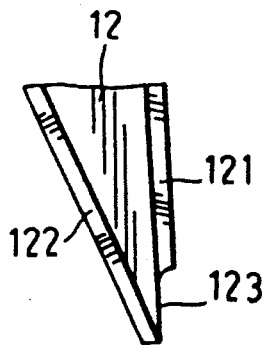
Figure 14D:
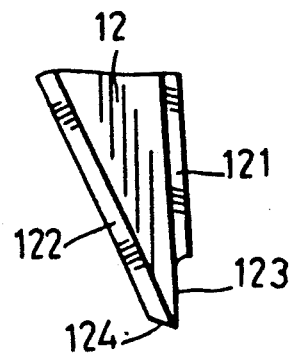

According to the present invention, the method of making the saw blade includes the steps:

(1) Forming an elongated metal saw blade having a gradually increasing thickness from a top longitudinal end to a bottom longitudinal end, please see FIGS. 13(a) and 13(b).

Figure 1:
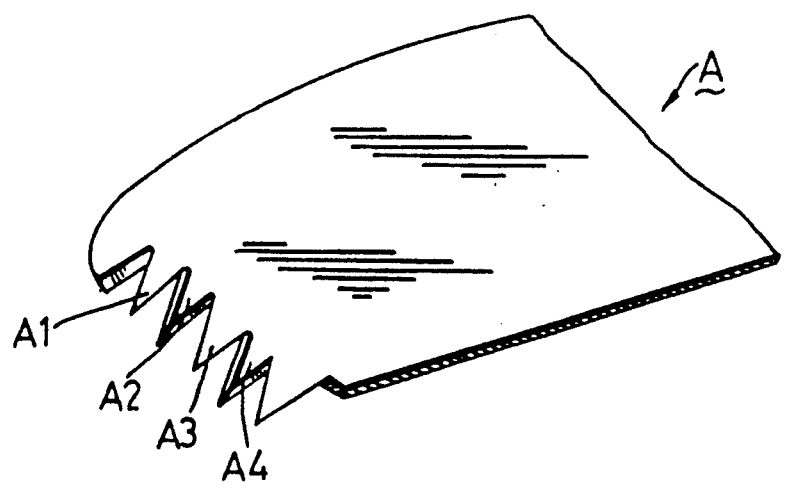
FIG. 1 shows a schematic, perspective view of a saw blade of the prior art.
Figure 2:
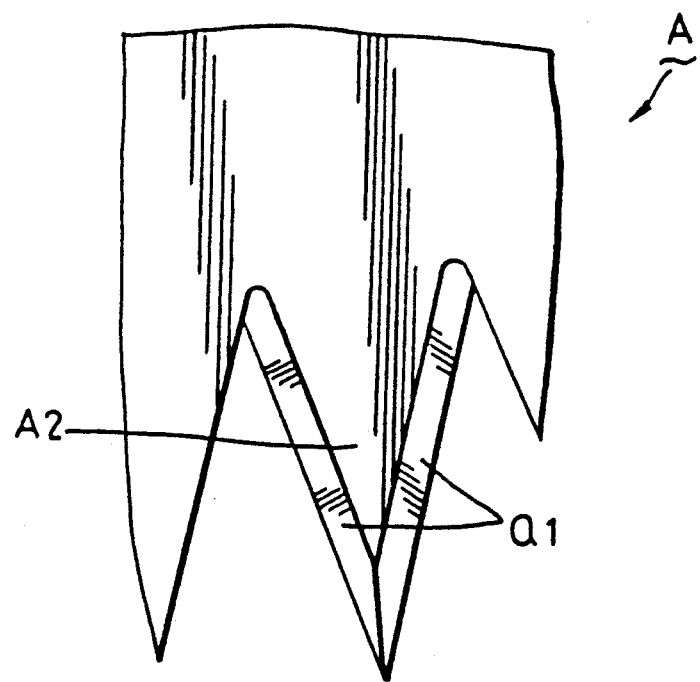
FIG. 2 shows a tooth of the saw blade of FIG. 1 viewed from a side perspective.
Figure 3:
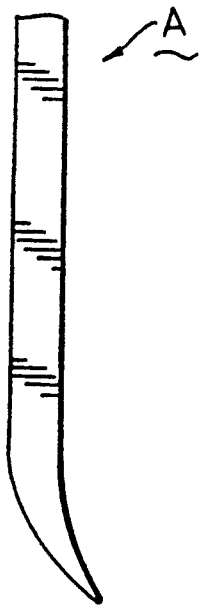
FIG. 3 shows a front view of the tooth of the saw blade of FIG. 1.
Figure 4:
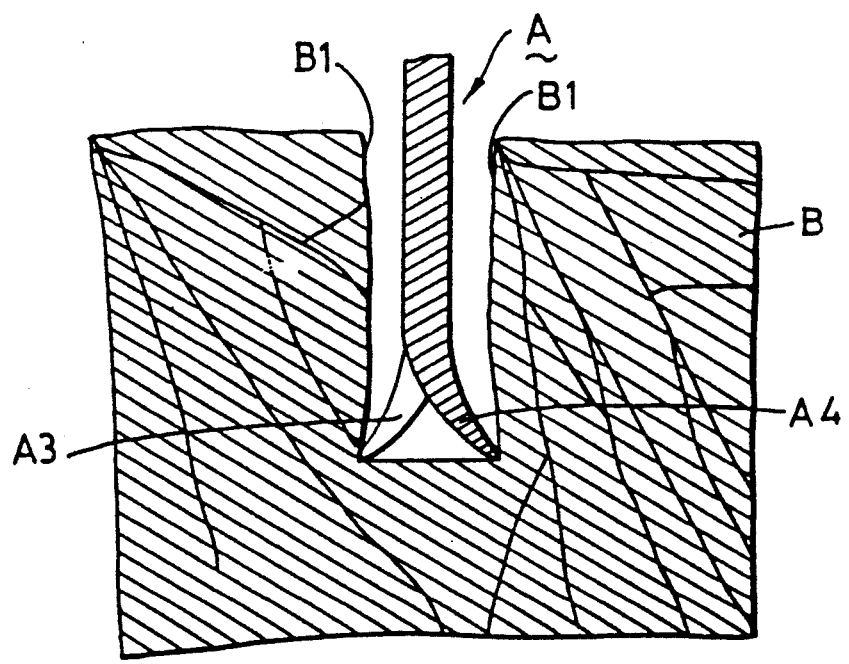
FIG. 4 shows the saw blade of FIG. 1 in use.
Figure 5:
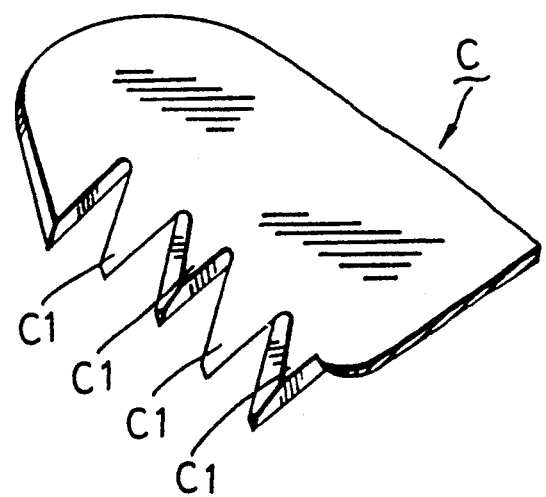
FIG. 5 shows a perspective, schematic view of another saw blade of the prior art.
Figure 6:
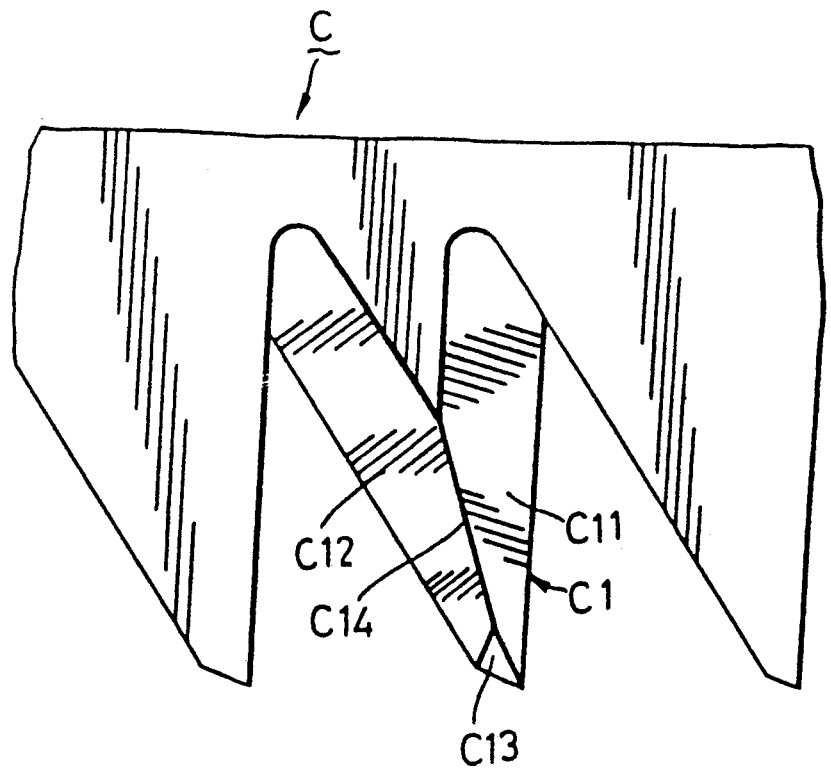
FIG. 6 shows a detailed view of a tooth of the saw blade of FIG. 5.
Figure 7:
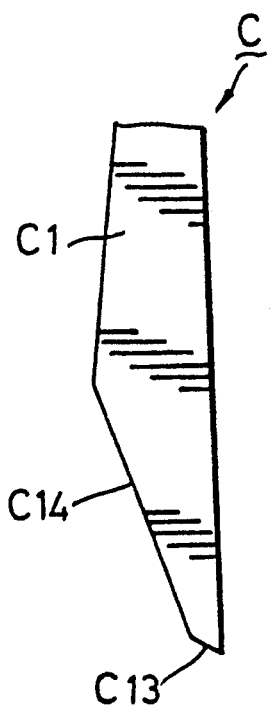
FIG. 7 shows a front view of the tooth of the saw blade of FIG. 5.
Figure 8:
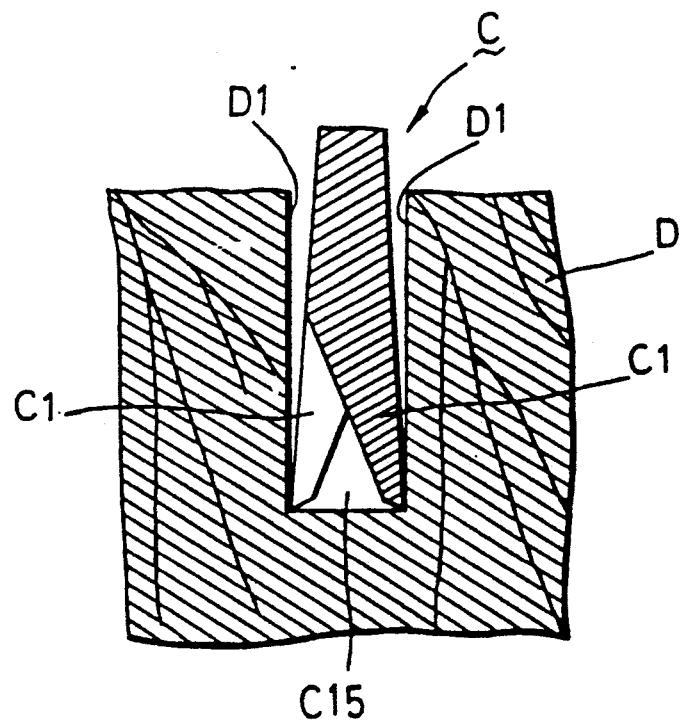
FIG. 8 shows the saw blade of FIG. 5 in use.

(2) Forming a plurality of teeth along the bottom longitudinal end in the arrangement explained above. The first type triangular tooth (C1) has two opposite sides which cooperatively form an apex and two opposite first and second flat faces. In order to obtain acute edges, the triangular tooth (C1) is provided with two inclined faces (C11,C12) which converge from the first triangular flat face towards the second triangular flat face in such a manner that a portion (14) of the two inclined faces (C12,C11) meet on the second triangular flat face adjacent to the apex thereof. The apex of the tooth (C1) is ground in such a manner that the apex is formed as a triangular tip face which extends upwards as depicted in FIG. 6.

Another of the first type of teeth is adjacent to the former one and is treated in the same manner but on the first triangular flat face (not depicted in the drawings).

(3) providing the second type tooth (12) having an initial trapezial shape when viewed from the side as the first type of tooth (11), the only difference being that the initial trapezial shaped tooth includes a cut (123) at a rear one of the inclined faces (122,121) which cut extends vertically from the distal bottom end to a predetermined height in a manner that the cut substantially forms an inverted L-shape. The distal bottom end is then ground to form a second triangular tip face (124) which extends inclinedly from a front portion towards a rear portion of the initial trapezial shaped tooth, as in FIGS. 14(a) to 14(d).

Once the teeth in the saw blade of the present invention are thus provided, one can saw a piece of wood with the saw blade of the present invention more conveniently than with the prior art saw blade. When sawing laminated wood, a layer of which comprises growth rings that are located linearly to the direction of the movement of the saw blade, the inverted L-shaped cutting edge of the second type of tooth can easily cut these growth rings of the layer which are left behind by the preceding first type of teeth, an important feature which the prior art saw blade can not accomplish. The rigid strength of the second types tooth (12) can be weakened due to the provision of an L-shaped cut if the second type tooth has a width taken across the imaginary line "I" equal to a width taken across the imaginary line "I" of each of the triangular teeth as seen in FIG. 9. In order to avoid this disadvantage, the second type tooth is made to have an average width larger than an average width of the triangular tooth before the "L" shape cut is provided at the apex of the second type tooth. Thus provided, the second type tooth can have a width adjacent to the second triangular tip face equal or greater than a width at the corresponding place at the first triangular tip face of the triangular tooth.

With the invention thus explained, it is obvious to those skilled in the art that various modifications and variations can be made without departing from the scope and spirit of the present invention. It is therefore intended that this invention be limited on as in the appended claims.

I claim:

1. A saw blade comprising:
    an elongated metal blade having a first side, a second side opposite to said first side, front end, a rear end opposite to said front end, a longitudinal top edge and a longitudinal bottom edge;
    a plurality of sets of teeth being formed along said longitudinal bottom edge, each of said sets of teeth including a first, second and third tooth located in succession, said first tooth having an apex, front and rear inclined first faces formed on said first side of said metal blade which converge from said second side toward said first side of said metal blade, said front inclined first face being nearer to said front end of said metal blade than said rear inclined first face, said apex of said first tooth having a first triangular tip face that extends toward said bottom edge and rearwards from said front inclined first face towards said rear inclined first face and from said second side towards said first side of said first tooth, said second tooth having an apex, front and rear inclined second faces formed on said second side of said metal blade which converge from said first side toward said second side of said metal blade, said apex of said second tooth being round thereby forming a second triangular tip face that extends toward said bottom edge and rearwards from said front inclined second face towards said rear inclined second face and from said first side toward said second side of said second tooth;
    a third tooth having an apex, front and rear inclined third faces formed on one of said first and second sides, portions of said front and rear inclined third faces meeting on one of said first and second sides, said front inclined third face being nearer to said front end of said metal blade than said rear inclined third face, an inverted L-shaped cut being formed on said rear inclined third face of said third tooth such that with said longitudinal top edge of said metal blade being held upward, said cut vertically extending from said apex to a predetermined height, said apex of said third tooth being ground such that said third tooth has a third triangular tip face that extends toward said bottom edge and rearwards from said front inclined third face toward said rear inclined third face of said third tooth to form a horizontal edge transverse to a longitudinal length of said metal blade when said third tooth is viewed from the rear end of said metal blade.

2. A saw blade as claimed in claim 1, wherein a cross-section taken adjacent to said third triangular tip face of said third tooth is greater than that of said first and second triangular tip faces of said first and second teeth taken at he corresponding section adjacent to said first and second triangular tip faces of said first and second teeth.

* * * * *

UNITED STATES PATENT AND TRADEMARK OFFICE
CERTIFICATE OF CORRECTION

PATENT NO. : 5,231,909
DATED : August 3, 1993
INVENTOR(S) : An-Sun Hsu

It is certified that error appears in the above-indentified patent and that said Letters Patent is hereby corrected as shown below:

Column 1, line 12, after "saw" insert --blade--.

Column 4, line 6, Claim 1, after "side," insert --a--.

Column 4, line 57, Claim 2, "he" should be --the--.

Signed and Sealed this

Fifth Day of April, 1994

Attest:

BRUCE LEHMAN

Attesting Officer

Commissioner of Patents and Trademarks